(12) United States Patent
Sang et al.

(10) Patent No.: US 11,263,491 B2
(45) Date of Patent: Mar. 1, 2022

(54) PERSON SEARCH METHOD BASED ON PERSON RE-IDENTIFICATION DRIVEN LOCALIZATION REFINEMENT

(71) Applicant: HUAZHONG UNIVERSITY OF SCIENCE AND TECHNOLOGY, Hubei (CN)

(72) Inventors: Nong Sang, Hubei (CN); Chuchu Han, Hubei (CN); Yuanjie Shao, Hubei (CN); Ruochen Zheng, Hubei (CN); Changxin Gao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/253,124

(22) PCT Filed: Jun. 23, 2020

(86) PCT No.: PCT/CN2020/097623
§ 371 (c)(1),
(2) Date: Dec. 17, 2020

(87) PCT Pub. No.: WO2021/077785
PCT Pub. Date: Apr. 29, 2021

(65) Prior Publication Data
US 2021/0365743 A1    Nov. 25, 2021

(30) Foreign Application Priority Data
Oct. 21, 2019 (CN) .......................... 201910998178.2

(51) Int. Cl.
*G06K 9/62* (2022.01)
*G06T 7/11* (2017.01)
(Continued)

(52) U.S. Cl.
CPC ......... *G06K 9/6265* (2013.01); *G06K 9/6215* (2013.01); *G06N 3/04* (2013.01);
(Continued)

(58) Field of Classification Search
CPC ......... G06T 2207/20084; G06T 3/4007; G06T 7/75; G06T 7/11; G06N 3/04;
(Continued)

(56) References Cited

U.S. PATENT DOCUMENTS

2015/0248586 A1\* 9/2015 Gaidon .............. G06K 9/00711
382/103
2018/0341837 A1\* 11/2018 Fitzsimmons ......... H04N 7/181
(Continued)

FOREIGN PATENT DOCUMENTS

| CN | 109902573 | 6/2019 |
| CN | 110334687 | 10/2019 |
| CN | 110826424 | 2/2020 |

OTHER PUBLICATIONS

"International Search Report (Form PCT/ISA/210) of PCT/CN2020/097623," dated Sep. 23, 2020, pp. 1-4.
(Continued)

*Primary Examiner* — Mia M Thomas
(74) *Attorney, Agent, or Firm* — JCIP Global Inc.

(57) ABSTRACT

The invention discloses a person search method based on person re-identification driven localization refinement. On one hand, the region of interest (ROI) conversion module converts an original input image into a small image corresponding to a ROI, and contradiction existing in part of features shared by a person re-identification network and a detection network is avoided; and on the other hand, loss of the person re-identification network can be transmitted back to the detection network in a gradient manner through the ROI conversion module, the supervision of loss of the (Continued)

person re-identification network for the detection bounding box output by the detection network is realized, and the adjusted detection bounding box can effectively remove background interference, contains more useful attribute information and is more suitable for person search, so that the person search accuracy is greatly improved.

8 Claims, 2 Drawing Sheets

(51) Int. Cl.
| | |
|---|---|
| *G06T 7/73* | (2017.01) |
| *G06K 9/00* | (2022.01) |
| *G06K 9/46* | (2006.01) |
| *G06N 3/04* | (2006.01) |
| *G06T 3/40* | (2006.01) |
| *G06V 10/94* | (2022.01) |
| *G06V 10/46* | (2022.01) |
| *G06V 20/64* | (2022.01) |
| *G06V 40/10* | (2022.01) |

(52) U.S. Cl.
CPC ............ *G06T 3/4007* (2013.01); *G06T 7/11* (2017.01); *G06T 7/75* (2017.01); *G06V 10/462* (2022.01); *G06V 10/95* (2022.01); *G06V 20/64* (2022.01); *G06V 40/10* (2022.01); *G06T 2207/20084* (2013.01)

(58) Field of Classification Search
CPC .............. G06K 9/6215; G06K 9/4671; G06K 9/00979; G06K 9/00362; G06K 9/00201; G06K 9/6265
See application file for complete search history.

(56) References Cited

U.S. PATENT DOCUMENTS

| | | | |
|---|---|---|---|
| 2019/0156154 A1* | 5/2019 | Tu | G06N 3/0454 |
| 2019/0205608 A1* | 7/2019 | Weitzman | G06K 9/0061 |
| 2020/0246690 A1* | 8/2020 | Weitzman | E04H 4/06 |
| 2021/0105578 A1* | 4/2021 | Chen | G06F 21/31 |

OTHER PUBLICATIONS

Zhang Jian-Ming, et al., "Summary of research on progress of person re-identification," Information Technology, Dec. 2017, pp. 172-176.

Tong Xiao, et al., "Joint Detection and Identification Feature Learning for Person Search," 2017 IEEE Conference on Computer Vision and Pattern Recognition (CVPR), Jul. 2017, pp. 1-10.

\* cited by examiner

PERSON SEARCH METHOD BASED ON PERSON RE-IDENTIFICATION DRIVEN LOCALIZATION REFINEMENT

CROSS-REFERENCE TO RELATED APPLICATION

This application is a 371 of international application of PCT application serial no. PCT/CN2020/097623, filed on Jun. 23, 2020, which claims the priority benefit of China application no. 201910998178.2, filed on Oct. 21, 2019. The entirety of each of the above mentioned patent applications is hereby incorporated by reference herein and made a part of this specification

BACKGROUND

Technical Field

The disclosure belongs to the technical field of computer vision technology, and more specifically, relates to a person search method based on person re-identification driven localization refinement.

Description of Related Art

At present, surveillance cameras are installed in densely populated public places, government departments, enterprises and institutions, residential communities, and even the homes of many residents, providing reliable video surveillance resources for maintaining public order and protecting people's lives and property. In video surveillance, due to the large changes in parameters such as the resolution and capturing angle of the camera, it is difficult to stably acquire face images with high quality, which causes poor stability in target tracking of face recognition technology. Relatively speaking, the person search technology can provide a target tracking solution with better robustness for video surveillance. Person search means that a picture containing the person to be identified is provided, and the person is detected and identified through gallery images, and person search includes two subtasks: person detection and person re-identification. Compared with person re-identification which directly adopts the cropped person picture, person search is closer to the real scene.

Current person search methods are mainly divided into two categories: one type of the methods is joint training by sharing some features of the person detection and person re-identification network, such as the first article on person search: "Joint detection and identification feature learning for person search, Computer Vision and Pattern Recognition (CVPR), 2017 IEEE Conference on IEEE, 2017: 3376-3385.". However, this type of methods ignores that person detection is a two-classification task, and person re-identification is a multi-classification task. There is a conflict in the practice of sharing features directly, and therefore the accuracy of this type of method is generally low. The other type of the methods is to perform detection and re-identification respectively, through which the two tasks are performed separately, and therefore joint optimization cannot be carried out well. The detection bounding box output by the detection network typically has background interference and is not suitable for person search. Therefore, generally the accuracy of this type of method is also low. In addition, the methods cannot achieve end-to-end detection, which also results in a relatively low efficiency of person search.

In summary, the current person search methods share some features to realize the joint training of the person detection network and the person re-identification network. Since there is conflict between shared features, the technical problem is that the accuracy of person search is low.

SUMMARY

Technical Problem

In view of the above shortcomings or needs of improvement of related work, the disclosure provides a person search method based on person re-identification driven localization refinement. The purpose of the disclosure is to solve the technical problem that the accuracy of person search is low due to the conflict between the shared features, which are shared by the current person search methods to realize the joint training of the person detection network and the person re-identification network.

In order to achieve the above purpose, the disclosure provides a person search method based on person re-identification driven localization refinement, including the following.

(1) A person re-identification driven localization refinement model is constructed; the person re-identification driven localization refinement model includes a detection module, a region of interest conversion module, and a person re-identification module.

The detection module is configured to detect a person in an input image and obtain coordinates of detected bounding boxes corresponding to the person position. The region of interest conversion module is configured to compute and obtain affine transformation parameters from the input image to the coordinates of detected bounding boxes according to the coordinates of detected bounding boxes, and extract a region of interest in the input image according to the affine transformation parameters and bilinear sampling. The person re-identification module is configured to extract depth features in the region of interest.

(2) An original picture is used as the input of the person re-identification driven localization refinement model, and a probability value of an identity tag corresponding to the person in the original picture is used as an expected output after the classification of features output by the person re-identification driven localization refinement model, and the person re-identification driven localization refinement model is trained.

(3) A query image to be searched and gallery images are respectively input into the trained person re-identification driven localization refinement model to obtain a person feature of the query image to be searched and the person feature of the gallery images, a similarity between the person feature of the query image to be searched and the person feature of the gallery images is computed, thereby obtaining a matching result of the query image to be searched.

Further, the person re-identification module is supervised by adopting cross entropy loss and triplet proxy loss.

Further, the method for supervising the person re-identification module by using a triplet proxy loss is specifically as follows.

(01) A triplet proxy table $T \in R^{N*K}$ configured to store the feature value of each category is initialized; where N represents the total number of categories of the samples, and K represents the number of features stored in each category.

(02) In forward propagation, the distance between samples of the same category is shorter and the distance between samples of different categories is longer by computing a value of the triplet proxy loss.

(03) In backward propagation, the features of corresponding category of the current sample in the triplet proxy table are updated, the existing features are replaced based on the first-in first-out principle.

Further, the loss function of the person re-identification module supervises the coordinates of detected bounding boxes output by the detection module.

Further, the detection module uses Faster R-CNN as the network backbone.

Further, the Faster R-CNN includes classification loss, but does not include regression loss.

Further, the anchor frame aspect ratio adopted by the Faster R-CNN is less than 1.

Further, the person re-identification module uses ResNet50 as the network backbone.

Further, the ResNet50 uses a batch normalization layer to replace the final fully connected layer of the network.

In summary, compared with the related art, the above technical solutions conceived by the disclosure can achieve the following advantageous effects.

(1) The present disclosure effectively realizes the joint optimization of the person detection network and person re-identification by designing the region of interest (ROI) conversion module. On the one hand, the ROI conversion module converts the original input image into a small image corresponding to the region of interest to avoid the contradiction existing in part of features shared by the person re-identification network and the detection network. On the other hand, the loss of the person re-identification network can be transmitted back to the detection network in a gradient manner through the (ROI) conversion module, so as to realize supervision of loss of the person re-identification network loss for the detection bounding box output by the detection network. The adjusted detection bounding box can effectively remove background interference, and will contain more useful attribute information, which is more suitable for person search, thus greatly improving the accuracy of person search.

(2) The disclosure designs a triplet proxy loss. A triplet proxy table is provided to store the features of all categories, and the features are updated in each iteration. Accordingly, even if there are too few samples in each training batch in the person search task and the conventional triplet loss cannot be established, it is possible to extract proxy samples from the triplet proxy table to establish a triplet, such that the distance between samples of the same category is shorter, and the distance between samples of different categories is longer, thereby improving the accuracy of person search.

DESCRIPTION OF THE EMBODIMENTS

In order to make the purposes, technical solutions and advantages of the present disclosure clearer, the following further describes the present disclosure in detail with reference to the accompanying drawings and embodiments. It should be understood that the specific embodiments described herein are only used to explain the present disclosure, but not to limit the present disclosure. In addition, the technical features involved in the various embodiments of the present disclosure described below can be combined with each other as long as they do not conflict with each other.

Figure 1:
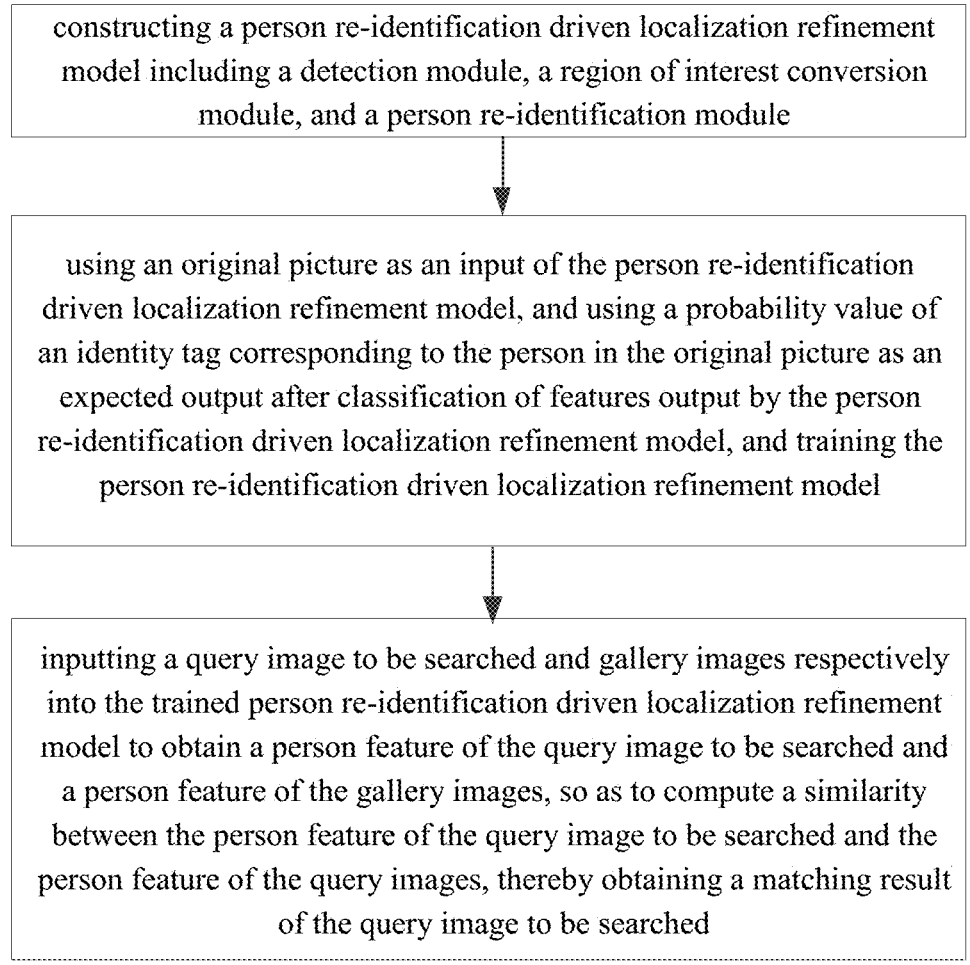
FIG. 1 is a flowchart of a person search method based on person re-identification driven localization refinement according to an embodiment of the disclosure.

As shown in FIG. 1, an embodiment of the disclosure provides a person search method based on person re-identification driven localization refinement, including the following.

Figure 2:
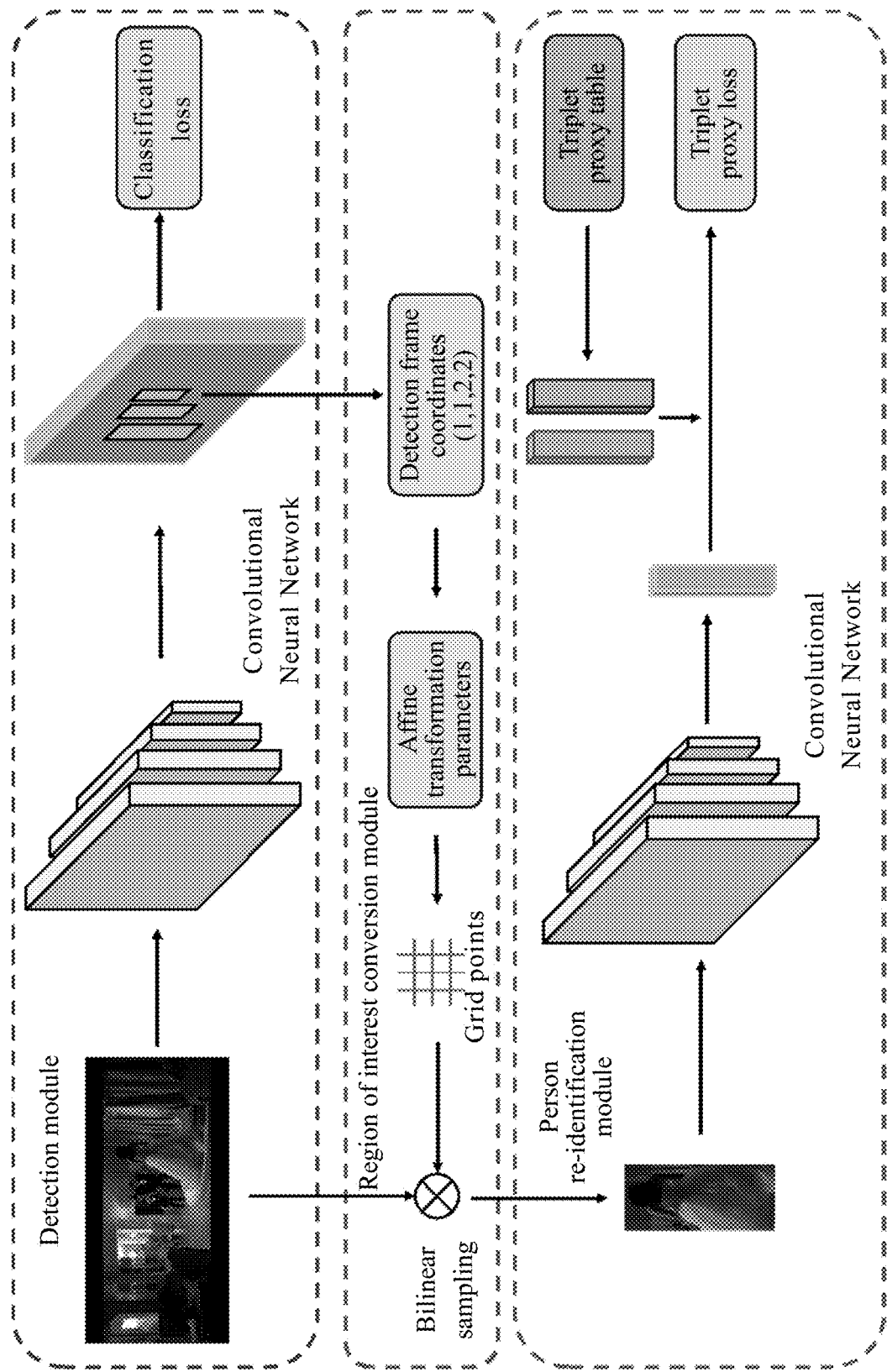
FIG. 2 is a structural diagram of a person re-identification driven localization refinement model according to an embodiment of the disclosure.

(1) A person re-identification driven localization refinement model is constructed. As shown in FIG. 2, the person re-identification driven localization refinement model includes a detection module, a region of interest conversion module, and a person re-identification module. Specifically, the detection module is configured to detect persons in the input image to obtain the coordinates of the detected bounding boxes corresponding to the person position. The region of interest conversion module is configured to compute and obtain the affine transformation parameters from input image to coordinates of the detected bounding boxes according to the coordinates of the detected bounding boxes, and extract the region of interest in the input image according to the affine transformation parameters and bilinear sampling. The person re-identification module is configured to extract depth features in the region of interest.

Specifically, the detection module provided by the embodiment of the disclosure adopts Faster R-CNN as the backbone of the network. Since the detection target is a person, the aspect ratio of the anchor in Faster R-CNN should be modified to be less than 1 in order to be more suitable for the proportion of the human body. In the embodiment of the disclosure, the aspect ratio of the anchor in Faster R-CNN is modified from 1:1, 1:2, 2:1 to 1:1, 1:2, 1:3. In the meantime, to enable the re-identification loss to dominate the formation of detection bounding box, instead of just making the detection bounding box close to the real frame, in the disclosure, only the classification loss of the original Faster R-CNN is retained, and the regression loss in the original network is removed.

With the function of the ROI conversion module, the loss of the re-identification network can be returned to the detection network in a gradient manner, so as to supervise the detected coordinates. Specifically, the following formula is adopted to compute and obtain the affine transformation parameters $\theta$ from input image to coordinates of the detected bounding boxes according to the coordinates of the detected bounding boxes.

$$\begin{pmatrix} x_i^s \\ y_i^s \end{pmatrix} = A_\theta \begin{pmatrix} x_i^t \\ x_i^t \\ 1 \end{pmatrix},$$

where $x_i^s$ and $y_i^s$ represent the coordinates of the detection bounding box in the original input image, and $x_i^t$ and $y_i^t$ represent the coordinates of the small image of the region of interest that is extracted.

According to the affine transformation parameters $\theta$ and bilinear sampling, the small image of the region of interest corresponding to the detection bounding box can be obtained, and the gradient return of the loss function can be realized. The calculation formula of the small image of the region of interest is as follows.

$$V = B(P^S, U),$$

where B represents bilinear sampling, U and V respectively represent the original input image and the small image of the region of interest, PS is the pixel points from the small image to the original input image obtained according to the affine transformation.

The person re-identification module uses ResNet50 as the backbone of the network. In order to keep the number of training categories consistent with the number of training set categories, in the disclosure, the final fully connected layer of ResNet50 is removed to obtain a modified residual network, and a batch normalization layer is added after the modified residual network.

(2) The original picture is used as the input of the person re-identification driven localization refinement model, and the probability value of the identity tag corresponding to the person in the original picture is used as the expected output after the classification of output features of the person re-identification driven localization refinement model, and the person re-identification driven localization refinement model is trained.

Specifically, the disclosure uses cross-entropy loss and triplet proxy loss to supervise the person re-identification module. Specifically, the triplet loss is a commonly used measurement loss in the field of person re-identification, and the loss can make the distance between samples of the same category shorter while making the distance between samples of different categories longer. However, since there are too few batch training samples in the person search task and the conventional triplet loss cannot be established, in the disclosure, a triplet proxy loss is designed, through which a triplet proxy table is used to store the features of all categories, and the features are updated in each iteration. In this manner, even if there are insufficient batch training samples to establish the triplet, it is possible to extract proxy samples from the triplet proxy table to establish a triplet, and therefore such method is called the triplet proxy loss. The method for supervising the person re-identification module by using the triplet proxy loss is specifically as follows. (01) The triplet proxy table $T \in R^{N*K}$ configured to store the feature value of each category is initialized; where N represents the total number of categories of the samples, and K represents the number of features stored in each category. The embodiment of the disclosure makes K=2. (02) In forward propagation, the distance between samples of the same category is shorter and the distance between samples of different categories is longer by computing a value of the triplet proxy loss.

$$L = \sum_{i=1}^{b} \left[ m + \max_{p=1,\ldots,K} D(f_i^a, f_i^p) - \min_{\substack{i=1,\ldots,b \\ n=1,\ldots,K \\ j \neq i}} (D(f_i^a, f_i^n)) \right],$$

where m constrains the distance between the negative sample pairs to be greater than the distance between the positive sample pairs, $f_i^a$, $f_i^p$, $f_i^n$ respectively represent the features of the anchor sample, the positive sample and the negative sample in the triplet, and D represents the Euclidean distance.

(03) In backward propagation, the features of corresponding category of the current sample in the triplet proxy table are updated, and the existing features are replaced based on the first-in first-out principle.

(3) The query image to be searched and the gallery images are respectively input into the trained person re-identification driven localization refinement model to obtain the person feature of the query image to be searched and the person feature of the gallery images, so as to compute the similarity between the person feature of the query image to be searched and the person feature of the gallery images, thereby obtaining the matching result of the query image to be searched.

Those skilled in the art can easily understand that the above descriptions are only preferred embodiments of the present disclosure and are not intended to limit the present disclosure. Any modification, equivalent replacement and improvement, etc. made within the spirit and principle of the present disclosure should fall within the scope of the present disclosure.

What is claimed is:

1. A person search method based on person re-identification driven localization refinement, characterized in comprising:
constructing a person re-identification driven localization refinement model, wherein the person re-identification driven localization refinement model comprises a detection module, a region of interest conversion module, and a person re-identification module; wherein the detection module is configured to detect a person in an input image and obtain coordinates of detected bounding boxes corresponding to a person position; the region of interest conversion module is configured to compute and obtain affine transformation parameters from the input image to the coordinates of the detected bounding boxes according to the coordinates of the detected bounding boxes, and extract a region of interest in the input image according to the affine transformation parameters and bilinear sampling; the person re-identification module is configured to extract depth features in the region of interest; using an original picture as an input of the person re-identification driven localization refinement model, and using a probability value of an identity tag corresponding to the person in the original picture as an expected output after classification of features output by the person re-identification driven localization refinement model, and training the person re-identification driven localization refinement model, wherein the person re-identification module is supervised by adopting cross entropy loss and triplet proxy loss; inputting a query image to be searched and gallery images respectively into the trained person re-identification driven localization refinement model to obtain a person feature of the query image to be searched and a person feature of the gallery images, computing a similarity between the person feature of the query image to be searched and the person feature of the gallery images, and obtaining a matching result of the query image to be searched.

2. The person search method based on person re-identification driven localization refinement according to claim 1.

3. The person search method based on person re-identification driven localization refinement according to claim 1, characterized in that a loss function of the person re-identification module supervises the coordinates of the detected bounding boxes output by the detection module.

4. The person search method based on person re-identification driven localization refinement according to claim 1, characterized in that the detection module uses Faster R-CNN as a network backbone.

5. The person search method based on person re-identification driven localization refinement according to claim 4, characterized in that the Faster R-CNN comprises classification loss, but does not comprise regression loss.

6. The person search method based on person re-identification driven localization refinement according to claim 5, characterized in that an anchor frame aspect ratio adopted by the Faster R-CNN is less than 1.

7. The person search method based on person re-identification driven localization refinement according to claim 1, characterized in that the person re-identification module uses ResNet50 as a network backbone.

8. The person search method based on person re-identification driven localization refinement according to claim 7, characterized in that the ResNet50 uses a batch normalization layer to replace a final fully connected layer of a network.

* * * * *